United States Patent [19]

Wong

[11] Patent Number: 4,978,721
[45] Date of Patent: Dec. 18, 1990

[54] FUNCTIONALIZED ELASTOMERIC POLYMERS

[75] Inventor: Pui-Kwan Wong, Amsterdam, Netherlands

[73] Assignee: Shell Oil Company, Houston, Tex.

[21] Appl. No.: 349,547

[22] Filed: May 9, 1989

[51] Int. Cl.$^5$ .................. C08F 8/00; C08F 255/06; C08F 279/02; C08F 287/00
[52] U.S. Cl. .................. 525/289; 525/326.1; 525/331.7; 525/331.9
[58] Field of Search .................. 525/289

[56] References Cited

U.S. PATENT DOCUMENTS 4,766,180 8/1988 Wong .................. 525/316

Primary Examiner—Carman J. Seccuro
Attorney, Agent, or Firm—Dean F. Vance

[57] ABSTRACT

Novel heat-curable elastomeric polymers comprise an elastomeric base polymer modified by the presence on the elastomeric base polymer molecule of at least one pendant carboxylic acid ester group wherein the ester moiety is alkyl arylcyclobutene. In a preferred embodiment, the base polymer is a selectively hydrogenated block copolymer of the poly-(vinylaromatic compound)/polyalkadiene type, and the ester moiety is methylbenzocyclobutene.

16 Claims, No Drawings

FUNCTIONALIZED ELASTOMERIC POLYMERS

FIELD OF THE INVENTION

This invention relates to certain functionalized elastomeric polymers and to a process for preparing such polymers. More particularly, the invention relates to elastomeric polymers functionalized by the presence therein of pendant ester groups wherein the ester contains a arylcyclobutene moiety.

BACKGROUND OF THE INVENTION

Elastomeric polymers, both homopolymers and copolymers, are well known in the art and include natural rubber and a wide variety of synthetic elastomeric materials. One class of synthetic elastomeric polymers includes homopolymers such as polybutadiene, polyisoprene and chloroprene. A second class of such elastomeric copolymers which is common in the art and in commerce is referred to as ethylene-propylene-diene monomer elastomers (EPDM). These EPDM elastomers are particularly useful elastomers since they are produced from relatively low cost materials and have good mechanical and elastomeric properties as well as resistance to thermal and chemical degradation. Yet another class of particularly useful elastomeric copolymers is the class of thermoplastic elastomers which demonstrate elastomeric properties at ambient temperatures but which are processable by methods conventional for non-elastomeric thermoplastics at somewhat elevated temperatures. Such thermoplastic elastomers are illustrated by block copolymers of a vinyl aromatic compound and a conjugated alkadiene, for example, a block copolymer of styrene and butadiene. The properties of such block copolymers are improved for many applications by the hydrogenation of some or all of the unsaturation in the polyalkadiene or aliphatic portion and, on occasion, the poly(vinyl aromatic compound) or aromatic portion.

It is known that the properties of many elastomeric polymers are often modified by "curing" or cross-linking the polymer, typically by adding a cross-linking or curing agent and maintaining the resulting mixture at an elevated temperature. Cross-linking of natural rubber by heating with sulfur or a sulfur-containing compound is the commercial vulcanization needed to make the rubber suitable for many commercial applications. Other types of curing are available, as by heating with peroxides, for example. These methods often have disadvantages such as a slow curing rate which requires additional materials to accelerate or promote the curing rate to a commercially acceptable level, the presence of undesirable side reactions caused by the presence of free radicals generated by the curing process, or the release of volatile side products during curing. It would be of advantage to provide heat-curable elastomeric polymers, that is, functionalized elastomeric polymers which are curable at acceptable rate without the emission of volatiles and without the requirement for added curing agents and accelerators.

SUMMARY OF THE INVENTION

This invention relates to a novel class of self-curable elastomeric polymers and to a method for the preparation thereof. More particularly, the invention relates to elastomeric polymers characterized by the presence of pendant ester groups wherein the ester contains a arylcyclobutene moiety.

DESCRIPTION OF THE INVENTION

The novel functionalized elastomeric polymers of the present invention are elastomeric polymers characterized by the presence of pendant ester groups of a particular type. Specifically, the functionalized elastomeric polymers contain a plurality of pendant ester groups of the formula

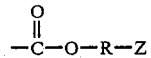

where R is alkylene of up to 4 carbon atoms and Z is an arylcyclobutene group, which ester groups are attached directly to a monomer forming a part of the elastomeric polymer or are attached indirectly through a bridging moiety to such a monomer. The ester-modified elastomeric polymers are produced by esterification of the corresponding polymers having pendant carboxylate groups which are in turn produced by neutralization of elastomeric polymers having pendant carboxylic acid functions.

A number of methods are known in the art for preparing elastomeric polymers having pendant carboxylic acid functionality, which polymers are suitable for esterification in the present invention.

In one modification, suitably functionalized elastomeric polymers may be prepared by incorporating the moiety of a functionalized monomer into an otherwise elastomeric polymer structure. For example, random copolymers and block copolymers containing a pendant carboxylic acid or ester group can be prepared by incorporation of an $\alpha,\beta$-ethylenically unsaturated carboxylic acid or ester as a monomer during elastomer preparation. Such elastomeric polymers are illustrated by butadiene-acrylic acid copolymers, prepared by bulk polymerization of 1,3-butadiene and acrylic acid using a benzoyl peroxide catalyst, as described in Polymer Bulletin 1986, 16, 35–41. In a polymer prepared from an unsaturated carboxylic acid ester monomer, the resulting pendant ester group is converted to a pendant carboxylic acid group by hydrolysis after preparation of the polymer.

In an alternate modification, elastomeric polymers can be prepared wherein the terminal group or end-cap of the polymer chain is a carboxylic acid functionality. Such polymers are obtained, for example, from anionically polymerized elastomers prepared with an organo alkali metal catalyst such as a lithium alkyl initiator. The lithium alkyl initiator is first used in an anionic solution polymerization of ethylenically unsaturated monomers to prepare an elastomeric polymer having lithium atoms on the ends of the polymer chains. The polymer chains may be homopolymer, random copolymer or block copolymer. The lithium atoms on the ends of the polymer chains are then contacted with carbon dioxide, followed by protonation to provide polymers having terminal carboxylic acid functionality. Such a process is known in the art.

Alternatively, in a more preferred embodiment, the elastomeric polymers having pendant carboxylic acid functionality can be prepared by introducing carboxylic acid functionality onto a non-functionalized elastomeric base polymer.

The elastomeric polymers useful as base polymers from which the functionalized elastomeric polymers are produced are the materials commonly known as "rubbers" and include natural rubber as well as the numerous synthetic elastomers. The synthetic elastomeric polymers are illustrated by homopolymers such as polybutadiene, polyisoprene and polychlorobutadiene (chloroprene) as well as by copolymers of butadiene or isoprene with styrene, acrylonitrile, alpha-methylstyrene and methacrylonitrile and the terpolymers known as EPDM polymers, for example, terpolymers of ethylene, propylene and a diene monomer such as cyclopentadiene. Such polymers, if not homopolymers, are suitably random as in the case of butadiene-acrylonitrile rubber or alternatively are block copolymers as in the case of the thermoplastic elastomeric polymers of the polystyrene-polybutadiene-polystyrene type. Such elastomeric polymers are more fully described, for example, by F. Billmeyer, Jr. in *Textbook of Polymer Science*, 3rd Edition, 1984, 371–82, and the reference cited therein, which are incorporated herein by reference. Other elastomeric polymers may be employed as well. See generally *Kirk-Othmer Encyclopedia of Chemical Technology*, 1965, Vol. 7, 677–716, Vol. 17, 543–684 and Supplement Volume, 1971, 910–32.

Regardless of the particular chemical structure of the elastomeric polymer, there will be sites active for functionalization, which sites may be aromatic rings, carbon-carbon double bonds, carbon atoms allylic to such double bonds or secondary or tertiary carbon atoms. The nature of these sites will to a large extent determine the portion of the elastomeric polymer molecule from which the ester group will be pendant. Such sites may be on an atom which is a part of the elastomeric polymer chain or alternatively are located on portions of the polymer which are attached to or pendant from the elastomeric polymer chain. Any of these active sites are suitably the basis for chemical transformations which lead to the ester-modified elastomeric polymers of the invention.

A number of methods are known in the art which serve to functionalize an otherwise hydrocarbon polymer molecule and these methods are suitably employed to introduce carboxylic acid functionality onto the base elastomeric polymer molecule. In one modification, carboxylic acid groups are introduced directly onto carbon atoms of monomers which form a portion of the polymer by consecutive processes of metalation, carboxylation and acidification. The process of metalation comprises the creation of a chemically active site on the elastomeric polymer molecule by reaction of the polymer and an active metal compound, particularly a compound wherein the metal is an alkali metal of Group I of the Periodic Table of Elements. The alkali metal compound is suitably an organometallic compound and organometallic compounds of lithium, sodium, potassium, rubidium or cesium are satisfactory. The organometallic compound is preferably an alkali metal alkyl or aryl and compounds such as methyllithium, isopropylsodium, sec-butyllithium and phenyl potassium are satisfactory. The lithium alkyls are preferred, especially when the alkyl is a secondary alkyl, and particularly preferred is sec-butyllithium. The metalation process serves to introduce the alkali metal onto the polymer, particularly in any aromatic portion of the elastomeric polymer molecule, e.g., onto carbon atoms of aromatic rings pendant from the polymer chain, but may also introduce alkali metal onto aliphatic carbon atoms, particularly carbon atoms which are allylic to carbon-carbon unsaturation in any aliphatic portion of the polymer molecule. Thus, employing lithium as the alkali metal, metalation of a polymer molecule containing aromatic rings and aliphatic portions having some degree of carbon-carbon unsaturation proceeds according to the following greatly simplified reaction scheme wherein the wavy lines indicate unspecified portions of the elastomeric polymer molecule.

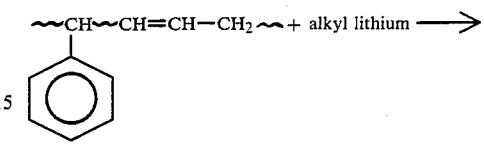

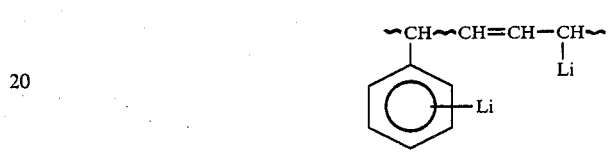

The above simplified scheme indicates metalation of both aliphatic and aromatic portions of the polymer molecule although it should be appreciated that metalation of either portion could occur without metalation of the other portion. In general, however, metalation of aromatic portions takes place preferentially if the level of unsaturation in the aliphatic portion is low. It should also be noted that metalation will typically introduce a number of alkali metal moieties onto any single polymer molecule, depending in part on the relative proportions of elastomeric polymer and organometallic compound reactants and the reaction conditions employed in the metalation process.

The metalation reaction typically takes place at a temperature from about 0° C. to about 100° C. in the liquid phase in the presence of an inert reaction diluent such as a saturated aliphatic hydrocarbon, e.g., cyclohexane. The amount of organometallic compound to be employed will suitably be from about 5 milliequivalents to about 95 milliequivalents per 100 grams of elastomeric polymer to be metalated. The metalation reaction, which is often unduly slow unless substantially elevated temperature is employed, is facilitated by the presence within the reaction mixture of an amine promoter. Tertiary amines are generally satisfactory as promoters for the metalation process although that class of tertiary amines known as bridgehead amines and exemplified by triethylene diamine is preferred. The promoter is employed in quantities which are approximately equimolar with the organometallic compound. This process of metalation is known in the art, being described more fully in Trepka, U.S. Pat. No. 4,145,298.

The carboxylation process which is applied to the metalated elastomeric polymer is also well known in the art. The metalated polymer is contacted with gaseous carbon dioxide by passing the carbon dioxide through a solution of the metalated polymer in an inert reaction diluent, preferably the diluent in which the metalated polymer is produced. A typical carboxylation reaction temperature is from about 0° C. to about 100° C. and a convenient pressure of carbon dioxide is that pressure required to bubble the carbon dioxide through the solution of metalated polymer. This process is described more fully in U.S. Pat. Nos. 4,145,490, 3,976,628 and published European Patent Application No. 215,501. The metalated polymer reacts with the carbon dioxide to produce an alkali metal salt of the carboxylated elastomeric polymer, thereby introducing carboxylate functionality into the elastomeric polymer. This alkali metal salt is acidified as by contact with dilute mineral acid, e.g., hydrochloric acid, and is recovered as the carboxylic acid-modified elastomeric polymer by conventional methods such as selective extraction or filtration.

In an alternate modification, the carboxylate-modified elastomeric polymers from which the ester-modified elastomeric polymers of the invention are produced are those polymers wherein the carboxylic acid function is attached to a monomer which forms a portion of the elastomeric polymer indirectly through a bridging or connecting group. Such carboxylic acid-modified polymers are typically produced by employing the carbon-carbon unsaturation of aliphatic portions of the molecule, or carbon atoms adjacent thereto, as active sites for introduction of the carboxylic acid function. One conventional type of this process involves, in effect, the addition of the elements of a mercaptocarboxylic acid across a carbon-carbon double bond of the aliphatic portion of the elastomeric polymer molecule. Such carboncarbon unsaturation is suitably between two carbon atoms each of which is in the elastomeric polymer chain or between carbon atoms at least one of which is in a group pendant from the principal polymer chain. Suitable mercaptocarboxylic acids for this purpose are preferably mercaptoalkanoic acids including mercaptoacetic acid (thioglycolic acid), mercaptopropionic acid and mercaptobutyric acid although the preferred mercaptoalkanoic acid is thioglycolic acid. By way of illustration, an EPDM elastomer, for example, will contain residual carbon-carbon unsaturation within moieties of the diene monomer. This unsaturation reacts with thioglycolic acid according to the following simplified reaction scheme

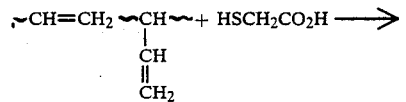

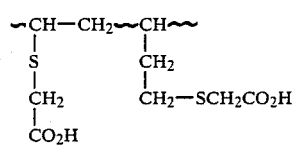

wherein the wavy lines indicate unspecified portions of the elastomeric polymer. The depicted scheme shows addition to chain unsaturation as well as pendant unsaturation for illustration purposes. Which of these types would occur and the likelihood and relative proportion of both types taking place will depend, of course, on the nature of the elastomeric polymer, the conditions under which it reacts with thioglycolic acid and the relative proportion of the reactants. In general, both types of addition take place in polymer molecules having both types of unsaturation.

The mercaptocarboxylic acid addition is well known in the art and is described by Calhoun et al, U.S. Pat. No. 3,052,657. Reaction takes place in an inert diluent, preferably an aromatic hydrocarbon such as benzene, and at a reaction temperature of from about 20° C. to about 100° C. in the liquid phase. The addition reaction is facilitated by the presence of free radical initiators such as t-butyl hydroperoxide or benzoyl peroxide or alternatively is initiated by irradiation with UV light. A specific example of this process as applied to an elastomeric polymer is shown by published Japanese Patent Application No. 54050590. The process as is apparent serves to introduce carboxylic acid functions attached to the elastomeric polymer by a connecting group, i.e., a —SCH$_2$— group, and will introduce a plurality of such groups depending in part on the degree of carbon-carbon unsaturation in the polymer molecule.

An alternate process of introducing pendant carboxylic acid groups or precursors thereof onto the elastomeric polymer molecule is to graft acid monomers onto the aliphatic portion of the polymer. In a generally preferred process, elastomeric polymers having carbon-carbon unsaturation in the aliphatic portion thereof are reacted with a maleic acid compound to form what is commonly referred to as a maleated polymer. These maleated polymers are illustratively produced by abstraction of a hydrogen atom from a carbon atom adjacent or allylic to a carbon-carbon double bond in the aliphatic portion of the molecule and addition of the hydrogen and the aliphatic portion of the polymer molecule across the carbon-carbon unsaturation of the maleic acid compound. By way of illustration, the production of maleated elastomeric polymer takes place according to the following simplified reaction schemes, employing maleic anhydride as the maleic acid compound, (a) to main chain unsaturation

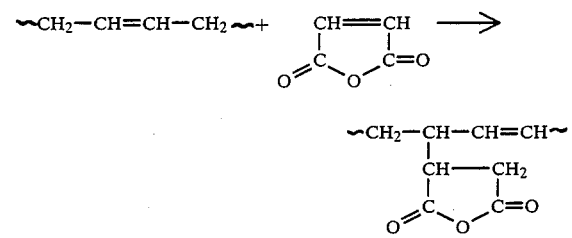

(b) to vinyl unsaturation

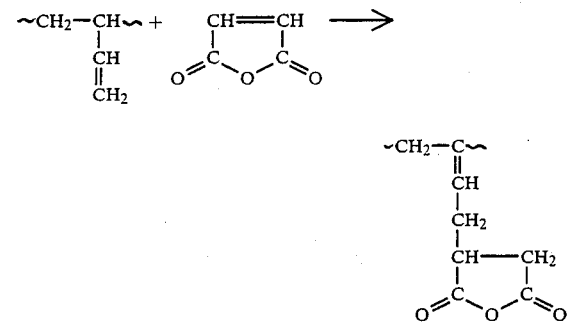

wherein the wavy lines represent unspecified portions of the elastomeric polymer.

Maleic acid compounds which are suitably employed as reactants in the production of the maleated elastomeric polymers include maleic acid, maleic anhydride, a mono-alkyl ester of maleic acid wherein the alkyl is alkyl of up to 4 carbon atoms inclusive, a mono-amide of maleic acid, and maleic imide. Of these, maleic anhydride is preferred. The production of these maleic acid compound-modified elastomeric polymers is well known in the art. In one modification, the elastomeric polymer and the maleic acid compound are contacted in the presence of a free radical initiator which is preferably a peroxy compound. Contacting customarily takes place at a temperature which is sufficient to melt the reactants and decompose the free radical initiator, for example, a temperature from about 75° C. to about 350° C. Such contacting is conducted in the substantial absence of solvent and often takes place in an extruder which serves to melt and mix the reactants and to heat the reaction mixture to the desired elevated reaction temperature. In an alternate maleation procedure, the elastomeric polymer and the maleic acid compound are contacted in a solvent such as benzene, toluene or xylene in the absence of a free radical initiator at a temperature from about 150° C. to about 200° C. and a pressure sufficient to maintain the reaction mixture in the liquid phase. Often a free radical inhibitor is employed in this modification to reduce gellation. The type of product obtained by the maleation process will depend upon the particular maleic acid compound employed. Use of maleic acid will result in the production of elastomeric polymers with pendant carboxylic acid functions whereas the pendant group from maleation with maleic anhydride is a pendant succinic anhydride group as is depicted above. However, pendant groups from the use of the maleic acid compounds described above will add carboxylic acid functions or the equivalents thereof since the other types of pendant groups, i.e., anhydride moieties, are convertible to carboxylic acid groups and are, in fact, converted to carboxyl groups during preparation of the ester-modified elastomeric polymers of the invention.

The extent of maleation will depend upon the degree of aliphatic unsaturation in the elastomeric polymer molecule, the reaction conditions and the relative proportion of reactants. Preferably, sufficient maleic acid compound is reacted with the elastomeric polymer to produce a maleated derivative containing from about 0.02% by weight to about 20% by weight, based on total polymer, of the moiety derived from the maleic acid compound grafted onto the polymer. More preferably the maleated polymer will contain from about 0.1% by weight to about 10% by weight, same basis, of the maleic acid compound moiety and most preferably from about 0.2% by weight to about 5% by weight of the maleic acid moiety on the same basis. In general, the solvent free "extruder-type" maleation process is preferred. Disclosures of such processes, now conventional, are found in U.S. Pat. Nos. 4,292,414; 4,427,828; 4,033,888; 4,628,072; 4,659,970 and 4,657,921. Other related processes are described in U.S. Pat. Nos. 4,578,429 and 4,670,173.

The extent of the above-described metalation/carboxylation, mercaptocarboxylic acid addition or maleation reaction is variable and depends on a number of factors as previously described, including the degree of carbon-carbon unsaturation present in the aliphatic or aromatic portions of the elastomeric polymer. Although the processes of introducing carboxylic acid functionality are operable over a wide range of carbon-carbon unsaturation, best results are obtained when no more than 25% and preferably no more than 5% of the monomeric units present in the aliphatic portion of the elastomeric polymer molecule contain carbon-carbon unsaturation. Methods are available for obtaining a base elastomeric polymer with a limited degree of aliphatic carbon-carbon unsaturation. In the production of EPDM elastomeric polymers, the use of a controlled proportion of diene monomer will result in the preparation of a base polymer with a correspondingly controlled degree of carbon-carbon unsaturation in the aliphatic portion of the molecule. Alternatively, the degree of carbon-carbon unsaturation is lowered to the preferred levels, if desired, by subjecting the base elastomeric polymer, prior to functionalization, to a process of hydrogenation. The hydrogenation of unsaturation within polymer molecules is well known in the art and includes catalytic hydrogenation in the presence of Raney Nickel or an elemental noble metal such as platinum or palladium in a finely divided form. Such hydrogenation typically results in the hydrogenation of most if not substantial)ly all of the unsaturation of any aromatic rings present as well as the unsaturation present in the aliphatic portion of the molecule. In a second type and generally preferred type of hydrogenation, a selective hydrogenation serves to hydrogenate most of the aliphatic carbon-carbon unsaturation without hydrogenating any substantial percentage of the aromatic rings present in the polymer molecule. This type of selective hydrogenation is illustrated by U.S. Pat. Nos. 3,113,986 and 4,226,952. By either type of process, the unsaturation of the aliphatic portion of the elastomeric polymer is reduced to the preferred level. By employing a base elastomeric polymer of an appropriate degree of carbon-carbon unsaturation in the aliphatic portion, any of the metalization/carboxylation processes, the mercaptocarboxylic acid addition process or the maleation process will produce a carboxylic acid-modified elastomeric polymer, or the functional equivalent in the case of certain maleic acid compounds, which are neutralized to produce the carboxylatemodified polymer employed as precursors of the ester-modified elastomeric polymer of the invention.

DESCRIPTION OF PREFERRED EMBODIMENT

In the preferred embodiment of the invention, the elastomeric polymer to be functionalized is a modified block copolymer which has been selectively hydrogenated. The preferred block copolymer base polymers suitable for selective hydrogenation are thermoplastic elastomers characterized by at least one block of at least predominantly polymerized vinyl aromatic hydrocarbon (A block) and at least one block of at least predominantly polymerized conjugated alkadiene (B block).

The vinyl aromatic hydrocarbon useful as the precursor of the A blocks has a vinyl group, i.e., a —C=CH$_2$ group, attached directly to an aromatic ring and has up to 12 carbon atoms inclusive. Preferred vinyl aromatic compounds are styrene and styrene homologs such as those of the formula

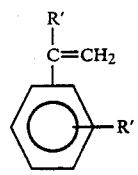

wherein R' independently is hydrogen or alkyl of up to 4 carbon atoms inclusive. Illustrative of such vinyl aromatic compounds are styrene, p-methylstyrene, p-ethylstyrene, m-propylstyrene, alpha-methylstyrene, alpha-ethylstyrene and alpha,4-dimethylstyrene. Styrene and alpha-methylstyrene are a preferred class of such vinyl aromatic compounds and especially preferred is styrene.

Each A block of the block copolymer independently is at least predominantly the polymerized vinyl aromatic and is preferably homopolymeric. Alternatively, however, one or more A blocks is a block wherein some of the monomer of block B is copolymerized with the predominant vinyl aromatic monomer of block A. Such blocks are termed "tapered" and have at least 85% by mole and preferably at least 93% by mole of the polymerized vinyl aromatic hydrocarbon with any remainder being the conjugated alkadiene of block B. The A blocks containing a mixture of the vinyl aromatic hydrocarbons are also suitable but are less preferred. The average molecular weight of an A block is typically from about 1,000 to about 125,000 but A blocks of an average molecular weight from about 7,000 to about 125,000 are preferred, an average molecular weight from about 7,000 to about 60,000 are more preferred.

Each B block of the block copolymer independently is a block of at least predominantly polymerized alkadiene. The alkadienes useful as the predominant monomer for a B block are conjugated alkadienes of up to 8 carbon atoms such as those of the formula

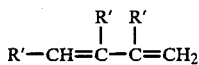

wherein R' has the previously stated significance. Illustrative of such alkadienes are 1,3-butadiene (butadiene), 2-methyl-1,3-butadiene (isoprene), 2,3-dimethyl-1,3-butadiene, 1,3-pentadiene (piperylene), 1,3-octadiene and 2-methyl-1,3-hexadiene. Preferred alkadienes are butadiene and isoprene, particularly butadiene. Each B block is at least predominantly polymerized alkadiene with the B block being at least 85% by mole and preferably at least 93% by mole of polymerized alkadiene with any remainder being the vinyl aromatic of block A in the case of tapered blocks. Homopolymeric blocks as each B block are preferred although tapered blocks and blocks of mixed alkadienes are also satisfactory. Within a polymerized alkadiene block two modes of polymerization are possible and are generally observed. In what is termed 1,4 polymerization, each carbon atom of the four carbon nucleus of the alkadiene is incorporated within the polymer chain which then includes two carbons joined by an ethylenic linkage. In 1,2 polymerization, the polymerization involves only one carbon-carbon double bond of the conjugated alkadiene. The carbon atoms of that bond will be incorporated within the polymer chain which will then contain a pendant vinyl group. Control of these two modes of polymerization is within the skill of the art. Preferred block copolymers are those wherein from about 75% to about 100% of the units of each B block are the result of 1,2 polymerization, preferably from about 25% to about 65% more preferably from about 35% to about 55%. The average molecular weight of a B block is suitably from about 10,000 to about 450,000, preferably from about 10,000 to about 150,000.

Within the block copolymer, when the A block content is not more than about 55 percent by weight the block copolymer has the characteristics of a thermoplastic elastomer. When the A block content is greater than about 60 percent by weight the block copolymer has the characteristics of a resinous polymer. Preferably A block content will be from about 2% by weight to about 55% by weight based on total block copolymer. Contents of total A block from about 10% by weight to about 40% by weight on the same basis are more preferred. The total average molecular weight of the block copolymer will be on the order of about 11,000 to about 2,500,000, preferably from about 25,000 to about 350,000, more preferably from about 35,000 to about 300,000. These average molecular weights are determined by conventional techniques such as gel permeation chromatography, or by gel permeation-low angle light scattering.

The structure of the block copolymer will depend upon the method of polymerization employed to produce the polymer. In one modification, the block copolymer is termed linear and is illustratively produced by sequential polymerization of the blocks. By way of example in the preparation of a three block copolymer or triblock polymer, the vinyl aromatic hydrocarbon of the A block is polymerized through the use of an initiator, preferably an alkyllithium compound. The conjugated alkadiene of the B block is then introduced and subsequently the additional vinyl aromatic hydrocarbon required for a second A block. Such a three block copolymer is characterized as ABA. A two block copolymer or a diblock polymer is produced by polymerizing an A block using a lithium initiator and subsequently introducing the conjugated alkadiene required for a B block. Such a polymer would be characterized as AB. Substantially complete polymerization of each monomer prior to introducing the monomer of the next block will result in the production of homopolymeric blocks. If, however, prior to the complete polymerization of the monomer of any one block, the monomer of the next block is introduced, tapered blocks will result. Similar sequential polymerization techniques are employed to produce block copolymers characterized as ABABA, ABAB, ABABABA or polymers of an even higher number of blocks. Production of block copolymers, particularly those of a relatively high number of blocks or relatively high molecular weight, is also accomplished by the use of a coupling agent to couple or connect growing polymer chains. Use of a difunctional coupling agent such as a dihaloalkane will result in the production of linear polymers but use of a coupling agent having a functionality of three or more, e.g., polyvinyl aromatic compounds, silicon tetrahalides or alkyl esters of dicarboxylic acids, will result in the formation of block copolymers termed "star", "radial" or "branched" respectively. The presence of a coupling agent within the polymer chain will have little or no effect on the properties of the polymer.

These block copolymers are well known in the art and the characterization and preparation of such polymers are illustrated by U.S. Pat. Nos. 3,251,905, 3,390,207, 3,598,887, 4,219,627, 4,408,357, 4,497,748 and 4,426,495.

The block copolymers most useful as precursors of the functionalized elastomeric polymers are preferably linear polymers of the following types:
polystyrene-polybutadiene (SB),
polystyrene-polyisoprene (SI),
polystyrene-polybutadiene-polystyrene (SBS), and
polystyrene-polyisoprene-polystyrene (SIS)
poly(alpha-methylstyrene)-polybutadiene-poly(alpha-methylstyrene)
poly(alpha-methylstyrene)-polyisoprene-poly(alpha-methylstyrene).

Block copolymers of the SBS type are particularly preferred. These block copolymers are now conventional and a number are commercial, being marketed by Shell Chemical Company as KRATON ® Thermoplastic Rubber.

To prepare the elastomeric polymers of limited aliphatic unsaturation which are functionalized to the carboxylic acid modified elastomeric polymers, the base block copolymers are selectively hydrogenated by a process sufficient to hydrogenate no more than about 25% but preferably no more than about 5% of the aromatic unsaturation present in the base block copolymer but sufficient to hydrogenate from about 80% to about 99% of the aliphatic unsaturation of the B block portion, thereby leaving from about 0.1% to about 20% of the aliphatic unsaturation as residual unsaturation. Such hydrogenation is accomplished by conventional methods illustrated by U.S. Pat. Nos. 3,113,986 and 4,226,952. The selectively hydrogenated block copolymer is often identified by the structure of the block copolymer precursor and the "apparent" structure of the aliphatic block. Thus, selective hydrogenation of a SBS polymer will result in a polymer having a hydrogenated mid-block which is apparently polyethylene in the case of a mid-block produced by 1,4 polymerization and ethylene/butylene copolymer in the case of a polymer mid-block produced with random proportions of 1,2 as well as 1,4-polymerization. These selectively hydrogenated block copolymers are indicated by SES and SEBS respectively. A corresponding diblock copolymer would be termed SE or SEB. The polymer produced by selective hydrogenation of a SIS block copolymer of a high degree of 1,4 polymerization in the mid-block is termed a SEPS because of the similarity of the hydrogenated mid-block to an ethylene/propylene copolymer. The preferred elastomeric block copolymers of limited aliphatic unsaturation are selectively hydrogenated block copolymers of the SES/SEBS type wherein units of the mid-block are from about 45% to about 65% of the E mid-block type with the remainder being of the EB type. The selectively hydrogenated block copolymers of these types are also well known in the art with a number being commercial. For example, certain of the selectively hydrogenated block copolymers are marketed by Shell Chemical Company as KRATON ® G Thermoplastic Rubber.

The selectively hydrogenated block copolymers are react(ed according to the processes described above to introduce carboxylic acid functionality into the elastomeric polymer molecule. Although the polymers are suitably maleated or are reacted with mercaptocarboxylic acids to introduce pendant carboxylic acid groups, the preferred method of introducing functionality is through a metalation/carboxylation process as described above.

The extent of metalation/carboxylation of the preferred selectively hydrogenated block copolymers will depend in part on the residual unsaturation of the aliphatic portion of the selectively hydrogenated block copolymer. In terms of the preferred polymers described above, sufficient metalation of the selectively hydrogenated block copolymer is necessary to prepare a carboxylated derivative containing an average of at least one carboxylic acid moiety per elastomeric polymer molecule. Preferably the carboxylated polymer will contain a plurality of at least 2 carboxylic acid moieties per polymer molecule, more preferably at least 5 and most preferably at least 10 carboxylic acid moieties per elastomeric polymer molecule. The process of the invention for preparing the novel heat-curable ester-modified elastomeric polymer is suitably applied to any carboxylic acid-functionalized elastomeric polymer independent of the precise nature of the elastomeric polymer or the particular process by which it was produced so long as there is an average of at least one carboxylic acid moiety (or the equivalent) per elastomeric polymer molecule, preferably at least 2, more preferably at least 5 and most preferably at least 10 carboxylic acid moieties per elastomeric polymer molecule.

In general, the process of the invention for preparing the novel ester-modified elastomeric polymers comprises neutralization of the carboxylic acid-modified elastomeric polymer followed by reaction with an arylcyclobutene compound of the formula $$Y-R-Z$$

where Y is halo or sulfonic ester, R is alkylene of up to 4 carbon atoms, and Z is an arylcyclobutene group.

Suitable Y in the above formula are those groups commonly referred to as good leaving groups in nucleophilic substitution reactions, for example, upper halo, i.e., halo other than fluoro, (chloro, bromo or iodo), preferably chloro or bromo, and more preferably chloro; or sulfonic ester such as aryl sulfonate, e.g., tosylate, brosylate or nosylate; alkyl sulfonate, e.g., mesylate; and fluoroalkyl sulfonate, e.g., triflates, nonaflates or tresylates. R is alkylene of up to 4 carbon atoms, preferably methylene or ethylene.

The arylcyclobutene group Z is an aryl group which contains one or more cyclobutene rings fused to an aromatic ring. An aryl group refers to any aromatic moiety of up to 20 carbon atoms and from one to 3 aromatic rings, inclusive. Suitable aryl groups include the single ring group benzene, fused-ring aromatic compounds, e.g. naphthalene, phenanthrene or anthracene, directly joined aryl compounds, e.g., biphenyl, or indirectly joined aromatic compounds comprising two or more aromatic moieties joined by an alkylene group, e.g., diphenyl alkanes. Z may contain substituents on the aromatic moiety other than the group —R—Y, such as lower alkyl, e.g., methyl or ethyl, or cyano, provided the substituents are inert under the conditions of the process of the invention. The cyclobutene ring may also contain such substituents, however, it is noted that substitution on the cyclobutene ring may affect the temperature at which the arylcyclobutene will undergo heat induced curing which likely involves ring opening to give reactive o-quinodimethane structures. Substitution of the cyclobutene ring generally lowers the temperature at which ring opening occurs. When the cyclobutene ring is unsubstituted, the ring opening typically does not occur at temperatures below about 200° C. Preferred arylcyclobutenes are unsubstituted other than by hydrogen and the group —R—Y, and the preferred arylcyclobutene group Z is benzocyclobutene.

The preferred embodiment of the arylcyclobutene compound is an halomethylbenzocyclobutene of the formula

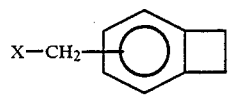

where X is upper halo, but preferably is chloro or bromo and most preferably is chloro. The halomethylbenzocyclobutene reactants are prepared by one of several reaction schemes depending on the desired spatial relationship between the halomethyl substituent and the cyclobutene ring. A 4-halomethylbenzocyclobutene is prepared from p-methylbenzyl halide, preferably p-methylbenzyl chloride, in two steps according to the procedure reported by G. W. Ewing and V. Boekelheide in *J. Chem. Soc. Chem. Commun.*, 1979, 207. Preparation of 3-chloromethylbenzocyclobutene may also be effected by a similar procedure beginning with o-methylbenzyl chloride, however, the procedure yields about a 1:2 mixture of 3-chloromethylbenzocyclobutene and 4-chloromethylbenzocyclobutene. This mixture is separated into its individual components by conventional methods such as distillation or chromatographic separation or alternatively is used as such without separation of the isomers.

The process of the invention comprises the neutralization of a carboxylic acid-modified elastomeric polymer followed by reaction with the arylcyclobutene compound, preferably the halomethylbenzocyclobutene. The neutralization is conducted by contacting the carboxylic acid-modified elastomeric polymer in liquid phase non-aqueous solution with a substantially equivalent amount of base. Suitable bases to be employed in the neutralization include alkali metal bases such as alkali metal hydroxides, e.g., sodium hydroxide or potassium hydroxide, or alkali metal carbonates and bicarbonates such as sodium bicarbonate, potassium carbonate, lithium bicarbonate and sodium carbonate. Preferred bases, however, are organic bases such as quaternary ammonium hydroxides and particularly the tetraalkylammonium hydroxides. Illustrative tetraalkylammonium hydroxides are those wherein each alkyl independently is alkyl of u to 10 carbon atoms inclusive, preferably of up to 4 carbon atoms inclusive, such as tetramethylammonium hydroxide, tetrabutylammonium hydroxide, trimethylpropylammonium hydroxide and methyltrihexylammonium hydroxide. Neutralization is conducted in substantially neutral liquid phase solution in an inert reaction diluent. Suitable diluents are organic diluents and include ethers, cyclic or acyclic, such as diethylether, diethylene glycol dimethyl ether, tetraethylene glycol diethyl ether, tetrahydroiuran and dioxane; sulfur-containing diluents such as dimethyl sulfoxide and sulfolane; and amides free from hydrogen substitution on the amide nitrogen such as N,N-dimethylformamide, N,N-diethylacetamide and N-methyl-2-pyrrolidone. Preferred diluents are tetrahydrofuran and dioxane. The neutralization is typically conducted by dissolving the carboxylic acid-modified elastomeric polymer in the reaction diluent and adding base to the resulting mixture to the point of neutrality. Best results are obtained in the subsequent esterification process if care is taken to avoid the addition of excess base during neutralization. It is possible and generally preferred to follow the course of the neutralization through the use of an indicator such as phenolphthalein or by potentiometric methods to avoid the addition of substantial amounts of excess base, e.g., more than about a 5–10% excess of base over that required for neutralization Neutralization of the carboxylic acid-modified elastomeric polymer results in conversion to the corresponding elastomeric polymer modified by the presence of carboxylate groups. Reaction of the base with pendant carboxylic acid groups results in the conversion of carboxylic acid to carboxylate groups. When the elastomeric polymer is a maleated polymer derived from maleic anhydride, a somewhat more complex reaction takes place. The pendant anhydride groups formed as depicted above are ring opened by reaction with base to form a carboxylate group and a second group the nature of which depends upon what materials are present during neutralization. In such instances it is helpful to employ an amount of an alkanol, e.g., ethanol or methanol, in the neutralization process to produce an ester group as well as a carboxylate group on ring opening of the anhydride moiety. Such alkanol is conveniently provided by employing an alcoholic solution of the base.

The carboxylate-modified elastomeric polymer is esterified by contact of the modified polymer and the arylcyclobutene compound at an elevated temperature in liquid phase solution. Best results are obtained by adding the arylcyclobutene compound to the carboxylate-modified elastomeric polymer in the substantially neutral solution in which the carboxylatemodified polymer was prepared. Suitable esterification promoters, such as tetraalkylammonium halides, may be added to the solution to accelerate the reaction or improve the esterification yield. Suitable reaction temperatures are from about 20° C. to about 150° C., preferably from about 50° C. to about 100° C. Suitable reaction pressures are those which are sufficient to maintain the reaction mixture in a liquid phase. Such pressures are typically up to about 20 atmospheres but more often are from about 1 atmosphere to about 10 atmospheres.

The quantity of arylcyclobutene compound to be employed will vary to some extent depending upon the degree to which the elastomeric polymer has been functionalized and the extent to which it contains pendant carboxylate groups. In general, quantities of arylcyclobutene compound from about 1 mole to about 100 moles per mole of carboxylate-modified elastomeric polymer are satisfactory. Amounts of arylcyclobutene compound from about 10 moles to about 50 moles per mole of carboxylate-modified elastomeric polymer are preferred. Subsequent to reaction, the ester-modified elastomeric polymer is recovered by conventional methods such as selective extraction or precipitation with a non-solvent.

The ester-modified elastomeric polymer products are characterized as elastomeric polymers having a plurality of pendant carboxylic acid ester groups attached directly to the polymer or indirectly through linking groups wherein the ester units are alkyl arylcyclobutene moieties. In a simplified depiction for neutralization with a base dissolved in an alkanol (R'OH) and subsequent esterification with an halomethylbenzocyclobutene of a maleated, selectively hydrogenated block copolymer of the SEBS type, the elastomeric polymer products are represented as follows

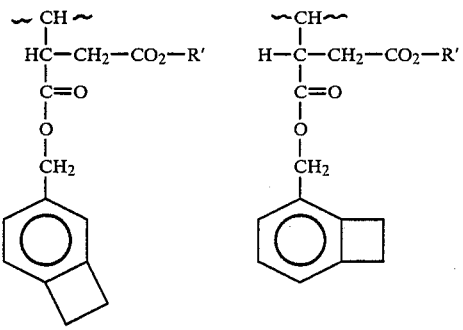

wherein the wavy line represents unspecified portions of the polymer. It should be appreciated that the above depiction is for purposes of illustration and what is depicted as a carbomethoxy group could be of a somewhat different structure, depending on what materials are actually present during the neutralization/esterification process. The precise nature of that substituent or any linking groups in general are of little or no significance in so far as the properties of the ester-modified elastomeric polymer is concerned so that the polymer is fairly described as an elastomeric polymer having pendant carboxylic acid ester groups wherein the ester is a alkyl arylcyclobutene group.

In the preferred embodiment of the invention, as described above, the carboxylic acid-modified elastomeric polymer is a metalated/carboxylated, selectively hydrogenated block copolymer of the SEBS type. When this preferred polymer is neutralized with methanolic base and esterified with an halomethylbenzocyclobutene, depiction of the ester-modified polymer is illustrated by the following

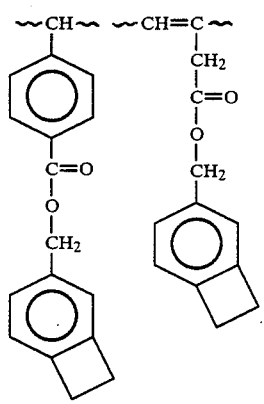

wherein the wavy lines represent unspecified portions of the elastomeric polymer. The carboxylate groups are attached to or pendant from aliphatic portions of the elastomeric polymer or from aromatic portions of the polymer as will be apparent from the above description of how and where carboxylic acid groups are introduced onto the elastomeric polymer molecule.

The ester-modified elastomeric polymers of the invention offer utilities associated with the elastomeric polymers from which they are produced. The polymers are useful in a number of molding applications including the molding of gears and valves and have additional utility in the production of adhesives. Those polymers of relatively low carbon-carbon aliphatic unsaturation offer good resistance to oxidative and chemical degradation in applications where shaped articles are desired and moreover exhibit good paintability and printability. However, unlike most conventional elastomeric polymers the ester-modified elastomeric polymers of the invention are heat-curable or heat-crosslinkable when heated to temperatures above about 200° C. without the emission of volatiles and without the requirement for additional curing agents or accelerators. Without wishing to be bound by any particular theory, it appears probable that such self-curing takes place by thermal ring opening of the cyclobutene rings to give reactive o-quinodimethane structures, which then homopolymerize, dimerize or react with unsaturated portions of other polymeric molecules. The resulting cured polymers offer the dimensional stability normally associated with crosslinked materials as well as toughness and tensile strength.

The invention is further illustrated by the following illustrative Embodiments which should not be construed as limiting.

ILLUSTRATIVE EMBODIMENT I

One aspect of the present invention deals with the thermal ring opening of the arylcyclobutene groups to give reactive o-quinodimethane structures. In this example, half-life values for a particular arylcyclobutene, benzocyclobutene, are calculated and summarized in the following Table 1, based on values reported in W. R. Roth et al, *Chem. Ber.*, 1978, 111, 3892–3903. The results suggest that reactive oligomers and polymers containing benzocyclobutenes which are not substituted at the cyclobutene ring would have long shelf-life at temperatures less than 200° C. and good reactivity at temperatures greater than 200° C.

TABLE 1

| | Benzocyclobutene $\xrightarrow{k}$ o-quinodimethane | |
|---|---|---|
| T (°C.) | k (sec$^{-1}$) | t (hr) |
| 25 | $2.5 \times 10^{15}$ | $7.6 \times 10^{10}$ |
| 100 | $1.7 \times 10^{-9}$ | $1.1 \times 10^{5}$ |
| 150 | $9.6 \times 10^{-7}$ | $2 \times 10^{2}$ |
| 200 | $1.4 \times 10^{-3}$ | 1.4 |
| 250 | $7.8 \times 10^{-3}$ | $2.5 \times 10^{-2}$ |

ILLUSTRATIVE EMBODIMENT II

Preparation of 4-Chloromethylbenzocyclobutene

4-Chloromethylbenzocyclobutene was prepared from p-methyl benzyl chloride in two steps according to the procedure reported by G. W. Ewing and V. Boekelheide in *J. Chem. Soc. Chem. Commun.* 1979, 207. The p-methyl-benzyl chloride was first alkylated with paraformaldehyde in the presence of $ZnCl_2$ and a catalytic amount of HCl to give 2,4-bis(chloromethyl)-toluene. Subsequent ring closure, with the elimination of HCl, to form the benzocyclobutene was performed by vacuum pyrolysis at 700° C. and <1 torr to give 4-chloromethylbenzocyclobutene.

Preparation of 4-chloromethylbenzocyclobutene was also effected by a similar procedure beginning with o-methylbenzyl chloride, however, the procedure yielded about a 1:2 mixture of 3-chloromethylbenzocyclobutene and 4-chloromethylbenzocyclobutene.

ILLUSTRATIVE EMBODIMENT III

The esterification process of the invention was demonstrated using KRATON G 1652 Thermoplastic Rubber marketed by Shell Chemical Company, a polystyrene-polybutadiene-polystyrene block copolymer which had been selectively hydrogenated and extruder maleated with maleic anhydride to introduce 0.12 milliequivalents of grafted maleic anhydride per gram of polymer, primarily in the aliphatic portion of the block copolymer. This polymer (3 g, 0.12 mmol of grafted maleic anhydride per gram of polymer) was dissolved in 150 ml of tetrahydrofuran and titrated to the phenolphthalein end point with 1N methanolic tetra-n-butylammonium hydroxide. The resulting polymer was esterified with 4-chloromethylbenzocyclobutene (0.9 g, 5.9 mmol) by refluxing in 50 ml of tetrahydrofuran for 24 hours. The ester-modified product was recovered by precipitation with a mixture of acetone and isopropanol. The presence of ester linkages was confirmed by the appearance of a strong carbonyl absorption at approximately 1740 cm$^{-1}$ in the infrared and the disappearance of the carboxylate absorption at 1550 cm$^{-1}$.

ILLUSTRATIVE EMBODIMENT IV

The maleated precursor polymer and the ester-modified polymer product of Illustrative Embodiment II were separately compression molded at 250° C. for 5 minutes. The resulting molded article of maleated precursor polymer was soluble in tetrahydrofuran, however, the resulting molded article of ester-modified polymer was insoluble in tetrahydrofuran, thereby confirming incorporation of benzocyclobutene and crosslinking of the polymer during the compression molding.

ILLUSTRATIVE EMBODIMENT V

A sample of KRATON G 1652 Thermoplastic Rubber was metalated with lithium alkyl and carboxylated to introduce upon acidification 0.22 mmol of acid functionality per gram of polymer, primarily in the styrene block of the copolymer according to the process of published European Patent Application No. 215,501. A 50 g sample of this polymer in 1 liter of tetrahydrofuran was titrated with 1N methanolic tetrabutylammonium hydroxide to the phenolphthalein end point. To the solution was added 4-chlorobenzocyclobutene (3.39 g, 22.2 mmol) and tetrabutylammonium iodide (0.43 g, 1.16 mmol) as an esterification promoter and the reaction mixture was refluxed for 24 hours. The cooled mixture was filtered to remove trace amounts of gel and the filtrate was added to 2 liters of isopropanol with stirring. The precipitated product was recovered by filtration, washed with isopropanol and dried in vacuo to give 45 g of product. The $^1$H-NMR spectra were consistent with the presence of benzocyclobutene methyl ester groups.

The esterified polymer and a sample of KRATON G 1652 were compression molded at 250° for 5 minutes.

The stress-strain and stress relaxation behavior at 70° C. of the two compression molded samples were compared. The stress-strain curves were measured at a strain rate of 0.5 in/min while the stress relaxation tests were done at an initial stress of 125 psi. The results showed that crosslinking of the styrene block improved the tensile properties and resistance to stress relaxation at 70° C. For tensile properties, crosslinking increased flow stress and ductility; for stress relaxation behavior, the strain rate reduction for equivalent stress reduction was greater.

ILLUSTRATIVE EMBODIMENT VI

A sample of KRATON G 1650 Thermoplastic Rubber was metalated with lithium alkyl and carboxylated to introduce upon acidification 0.9 mmol of acid functionality per gram of polymer primarily in the styrene block of the copolymer according to the process of published European Patent Application No. 215,501. A sample of this polymer in tetrahydrofuran was titrated with 1N methanolic tetrabutylammonium hydroxide and then contacted with 4-chlorobenzocyclobutene according to the procedure of illustrative Embodiment V. The reaction mixture was refluxed for 4 hours. The polymer product was precipitated by addition of isopropanol with stirring. The precipitated product was recovered by filtration, washed with isopropanol and dried in vacuo. The nearly quantitative conversion of the carboxylate ions to 4-benzocyclobutene methyl esters was confirmed by the disappearance of the carboxylate absorption at 1560 cm$^{-1}$ in the infrared and the appearance of a strong carbonyl absorption at approximately 1720 cm$^{-1}$

ILLUSTRATIVE EMBODIMENT VII

Compression molding of the ester-modified polymer of Illustrative Embodiment VI at 250° C. for 5 minutes gave crosslinked films which were insoluble in either toluene or THF, whereas films molded at 150° C. for 30 minutes were soluble. These results are consistent with the reported reactivity of benzocyclobutene (half-life at 150° C.=200 h, half-life at 250° C.=1.5 min. See Table 1).

Dynamic thermomechanical analysis showed that crosslinking via benzocyclobutenes raised the glass transition temperature of the polystyrene domain by 8° C. but had no effect on the glass transition temperature of the rubber phase. This suggests that crosslinking occurs mostly in the polystyrene phase.

What is claimed is:

1. A heat-curable, crosslinkable elastomeric composition which comprises an elastomeric polymer having at least two pendant carboxylic acid ester groups wherein the ester moiety is of the formula —R—Z, where R is alkylene of up to 4 carbon atoms and Z is an arylcyclobutene group.

2. The heat-curable elastomeric polymer of claim 1 wherein the ester moiety is methyl benzocyclobutene.

3. The heat-curable elastomeric polymer of claim 2 wherein the elastomeric polymer is an ethylene-propylene-diene monomer rubber.

4. The heat-curable elastomeric polymer of claim 3 wherein the pendant carboxylic acid ester group is an ester of a carboxylic acid of the formula —S—CH$_2$—CO$_2$H attached directly to a monomeric moiety of the elastomeric polymer.

5. The heat-curable elastomeric polymer of claim 2 wherein the elastomeric polymer is a selectively hydrogenated block copolymer of at least one block of at least predominantly polymerized vinyl aromatic compound and at least one block of at least predominantly polymerized alkadiene.

6. The heat-curable elastomeric polymer of claim 5 wherein the pendant carboxylic acid ester group is an ester of a carboxylic acid of the formula —CO$_2$H attached directly to a monomeric moiety of the elastomeric polymer.

7. The heat-curable elastomeric polymer of claim 6 wherein the pendant carboxylic acid ester group is attached directly to an aromatic moiety of the elastomeric polymer.

8. The heat-curable elastomeric polymer of claim 5 wherein the selectively hydrogenated polymer is of the styrene-ethylene/1butene-styrene type.

9. The heat-curable elastomeric polymer of claim 8 wherein the pendant carboxylic acid ester group is an ester of a carboxylic acid of the formula —CO$_2$H attached directly to a monomeric moiety of the elastomeric polymer.

10. The heat-curable elastomeric polymer of claim 9 wherein the pendant carboxylic acid ester group is attached directly to an aromatic moiety of the elastomeric polymer.

11. The heat-curable elastomeric polymer of claim 5 wherein the pendant carboxylic acid ester group is an ester of a carboxylic acid of the formula

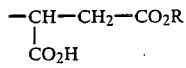

attached directly to a monomeric moiety of the elastomeric polymer.

12. The heat-curable elastomeric polymer of claim 8 wherein the pendant carboxylic acid ester group is an ester of a carboxylic acid of the formula

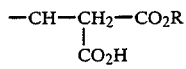

attached directly to a monomeric moiety of the elastomeric polymer.

13. The heat-curable elastomeric polymer of claim 1 wherein Z is benzocyclobutene.

14. The heat-curable elastomeric polymer of claim 12 heated to a temperature of at least 200° C.

15. The heat-curable elastomeric polymer of claim 9 heated to a temperature of at least 250° C. for 5 minutes.

16. The heat-curable elastomeric polymer of claim 11 heated to a temperature of at least 200° C.

* * * * *